United States Patent [19]

Kalpakci et al.

[11] Patent Number: 4,811,788
[45] Date of Patent: Mar. 14, 1989

[54] SURFACTANT COMBINATIONS AND ENHANCED OIL RECOVERY METHOD EMPLOYING SAME

[75] Inventors: Bayram Kalpakci, Sagamore Hills; Yvonne Jeans, Shaker Hts., both of Ohio

[73] Assignee: The Standard Oil Company, Cleveland, Ohio

[21] Appl. No.: 829,431

[22] Filed: Feb. 13, 1986

[51] Int. Cl.$^4$ .............................................. E21B 43/22
[52] U.S. Cl. ..................... 166/246; 166/273; 166/274; 252/8.554; 252/353
[58] Field of Search ............ 252/8.55 D, 8.554; 166/273, 274, 275, 246

[56] References Cited

U.S. PATENT DOCUMENTS

| | | | |
|---|---|---|---|
| 3,916,994 | 11/1975 | Maddox et al. | 166/271 |
| 4,011,273 | 3/1977 | Abend et al. | 568/816 X |
| 4,077,471 | 3/1978 | Shupe et al. | 252/8.554 X |
| 4,181,178 | 1/1980 | Savins | 166/274 |
| 4,231,427 | 11/1980 | Kalfoglon | 166/275 |
| 4,269,271 | 5/1981 | Shupe et al. | 166/274 |
| 4,270,607 | 6/1981 | Caredenas et al. | 166/273 |
| 4,293,428 | 10/1981 | Gale et al. | 252/8.554 |
| 4,296,812 | 10/1981 | Kalfoglou | 252/8.554 X |
| 4,307,782 | 12/1981 | Schievelbein | 166/274 |
| 4,316,809 | 2/1982 | Griffith et al. | 252/8.55 D |
| 4,446,079 | 5/1984 | Hoskin | 252/8.554 X |
| 4,457,372 | 7/1984 | Doster et al. | 166/274 |
| 4,468,335 | 8/1984 | Chen et al. | 252/8.554 |
| 4,468,342 | 8/1984 | Chen | 252/8.554 X |
| 4,478,281 | 10/1984 | Balzer et al. | 166/274 |
| 4,485,873 | 12/1984 | Balzer et al. | 166/274 |
| 4,549,607 | 10/1985 | Morita et al. | 166/274 |
| 4,554,974 | 11/1985 | Kalpakci et al. | 166/273 |

OTHER PUBLICATIONS

Schechter, R. S. et al. "Tertiary Oil Recovery Processes", Progress Report for reporting period of 1/1/84–3/31/84, Contract No. DE-AS19-80BC10345.
Carmona, I. et al, "Synthesis and Performance of Linear Monoisomeric Ethylene Oxide Sulfonate Surfactants", J. Dispersion Science and Technology, 4(4), 361–370 (1983).

Primary Examiner—Herbert B. Guynn
Attorney, Agent, or Firm—Raymond F. Keller; David J. Untener; Larry W. Evans

[57] ABSTRACT

A composition is disclosed which comprises:
(A) a compound represented by the formula

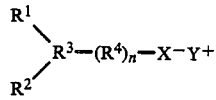

wherein: $R^1$ and $R^2$ are independently hydrocarbyl groups of from about 2 to about 24 carbon atoms; $R^3$ is a trivalent hydrocarbyl group of from 1 to about 16 carbon atoms; $R^4$ is $CH_2CH_2O$, $CH_2CH_2CH_2O$ or a mixture thereof; X is $SO_3^-$, $SO_4^-$ or $COO^-$; and Y is an alkali metal or

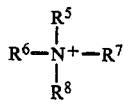

wherein $R^5$, $R^6$, $R^7$ and $R^8$ are independently hydrogen or methyl; and n is a number ranging from zero to about 15; and (B) a compound represented by the formula $R^9-(R^{10})_mA^-D^+$ wherein: $R^9$ is a hydrocarbyl group of from about 8 to about 24 carbon atoms; $R^{10}$ is $CH_2CH_2O$, $CH_2CH_2CH_2O$ or a mixture thereof; A is $SO_3^-$, $SO_4^-$ or $COO^-$; D is an alkali metal or

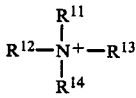

wherein $R^{11}$, $R^{12}$, $R^{13}$ and $R^{14}$ are independently hydrogen or methyl; and m is a number ranging from 1 to about 18. An enhanced oil recovery method employing the foregoing composition as a sufactant is also disclosed.

16 Claims, No Drawings

4,811,788

SURFACTANT COMBINATIONS AND ENHANCED OIL RECOVERY METHOD EMPLOYING SAME

TECHNICAL FIELD

This invention relates to a novel combination of surfactants and to an enhanced oil recovery method employing these surfactants.

BACKGROUND OF THE INVENTION

In the recovery of oil from oil-bearing reservoirs, it usually is possible to recover only minor portions of the original oil in place by the socalled primary recovery methods which utilize only the natural forces present in the reservoir. A variety of supplemental recovery techniques have been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected-water, and the wettability characteristics of the rock surfaces within the reservoir are factors which influence the amount of oil recovered by waterflooding. It has been proposed to add surfactants to the flood water in order to lower the oil-water interfacial tension and/or to alter the wettability characteristics of the reservoir rock. Processes which involve the injection of aqueous surfactant solutions are commonly referred to as surfactant waterflooding or as low tension waterflooding, the latter term having reference to the mechanism involving the reduction of the oil-water interfacial tension. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

A problem with stability and effectiveness arises when these surfactants and thickeners are used in environments characterized by temperatures in the range of about 70° C. to about 120° C. and above, high pressures (e.g., up to about 4000 psi), high concentrations of divalent metal ions such as calcium, magnesium, etc. (e.g., up to 3000 ppm or more and in some instances as high as 10,000 or 20,000 ppm), and high salinity (e.g., total dissolves salts (TDS) levels of up to about 200,000 ppm).

Many waterflooding applications have employed anionic surfactants. For example, a paper by W. R. Foster Entitled "A Low-Tension Waterflooding Process", Journal of Petroleum Technology, Vol. 25, Feb. 1973, pp. 205–210, describes a technique involving the injection of an aqueous solution of petroleum sulfonates within designated equivalent weight ranges and under controlled conditions of salinity. The petroleum sulfonate slug is followed by a thickened water slug which contains a viscosifier such as a water-soluble biopolymer. This thickened water slug is then followed by a driving fluid such as a field brine which is injected as necessary to carry the process to conclusion.

One problem encountered in waterflooding with certain of the anionic surfactants such as the petroleum sulfonates is the lack of stability of these surfactants in so-called "hard water" environments. These surfactants tend to precipitate from solution in the presence of relatively low concentrations of divalent metal ions such as calcium and magnesium ions. For example, divalent metal ion concentrations of about 50–100 ppm and above usually tend to cause precipitation of the petroleum sulfonates.

Nonionic surfactants, such as polyethoxylated alkyl phenols, polyethoxylated aliphatic alcohols, carboxylic esters, carboxylic amides, and polyoxyethylene fatty acid amides, have a somewhat higher tolerance of polyvalent ions such as calcium or magnesium than do the more commonly utilized anionic surfactants. While it is technically feasible to employ a nonionic surfactant solution to decrease the interfacial tension between the injected aqueous displacing medium and petroleum contained in some limestone formations, such use is generally not economically feasible for several reasons. Nonionic surfactants are not as effective on a per mole basis as are the more commonly used anionic surfactants and, additionally, the nonionic surfactants generally have a higher cost per unit weight than do the anionic surfactants. The polyethoxylated alkyl phenol nonionic surfactants usually exhibit a reverse solubility relationship with temperature and become insoluble at temperatures of above their cloud points making them ineffective in many oil formations. Nonionic surfactants that remain soluble at elevated temperatures are generally not effective in reducing interfacial tension. Other types of nonionic surfactants hydrolyze at temperatures above about 75° C.

The use of certain combinations of anionic and nonionic surfactant to combat hard water formations has also been suggested. For Example, U.S. Pat. No. 3,811,505 discloses the use of alkyl or alkylaryl sulfonates or phosphates and polyethoxylated alkyl phenols. U.S. Pat. N. 3,811,504 discloses the use of three component mixture including an alkyl or alkylaryl sulfonate, an alkyl polyethoxy sulfate and a polyethoxylated alkyl phenol. U.S. Pat. No. 3,811,507 discloses the use of a water-soluble salt of a linear alkyl or alkylaryl sulfonate and a polyethoxylated alkyl sulfate.

Cationic surface-active materials such as quaternary ammonium salts, and derivatives of fatty amines and polyamines, have also been used. However, these compounds have the disadvantage of substantivity or attraction especially towards silicate rock, and they lose their activity by adsorption.

The use of certain amphoteric surfactants which function as cationics in acid media and become anionic when incorporated in alkaline systems has been suggested. For example, U.S. Pat. No. 3,939,911 discloses a surfactant waterflooding process employing a three-component surfactant system. This surfactant system includes an alkyl or alkylaryl sulfonate such as an ammonium dodecyl benzene sulfonate, a phosphate ester sulfonate, and a sulfonated betaine such as a $C_{12}$–$C_{24}$ alkylamide $C_1$–$C_5$ alkane dimethylammonium propane sulfonate.

The use of hydrocarbyl-substituted polyoxyalkylene sulfonates is disclosed, for example, in U.S. Pat. Nos. 3,916,994; 4,181,178; 4,231,427; 4,269,271; 4,270,607; 4,296,812; 4,307,782; 4,316,809; 4,485,873; and 4,478,281.

U.S. Pat. Nos. 4,468,335 and 4,468,342 disclose the use of branched alkyl-substituted polyethoxypropane sulfonates. In this regard, the '335 patent, in a preferred embodiment, discloses the use of compounds of the formula $$RO(C_2H_4O)_xCH_2CH_2CH_2SO_3Na$$

wherein R is

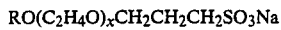

in which $R_1$ has 7–26 carbon atoms, $R_2$ has 2–10 carbon atoms, and $R_3$ has 6–26 carbon atoms. The '342 patent discloses the use of blends of at least two homologous surfactants of the formula $$R(OC_2H_4)_n\text{-}OCH_2CH_2CH_2SO_3Na$$

wherein R is

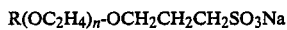

in which $R^1$ and $R^2$ are the same or different alkyl groups of 4–24 carbon atoms and the total number of carbon atoms in $R^1$ and $R^2$ is 10–30, and n is 2–6.

The use of thickening agents to increase the viscosity of injected water, normally to a value of at least equal to that of the reservoir oil, in order to arrive at a favorable mobility ratio between the oil and water and increase the macroscopic displacement efficiency of waterflood is known. Examples of such thickeners or mobility control agents are Polysaccharide B-1459 available from Kelco Company under the tradename "Kelzan" or the partially hydrolyzed polyacrylamides available from the Dow Chemical Company under the tradename "Pusher" chemicals.

While many surfactant waterflooding methods have been proposed, there is a substantial, unfulfilled need for surfactants and waterflooding methods employing such surfactants that are useful in recovering oil from subterranean formations wherein the surfactants employed are exposed to high temperatures, high salinities, high pressures, and high concentrations of divalent metal ions.

SUMMARY OF THE INVENTION

The present invention contemplates the provision of novel surfactant combinations, and waterflooding methods for recovering oil from subterranean formations employing these surfactant combinations. This method is particularly suitable for use with formations where in the surfactants employed are exposed to temperatures in the range of about 15° C. to about 120° C. and above, high pressures high concentrations of divalent metal ions and high salinities.

Broadly stated, the invention provides for a composition comprising:

(A) a compound represented by the formula

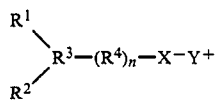

wherein: $R^1$ and $R^2$ are independently hydrocarbyl groups of from about 2 to about 24 carbon atoms; $R^3$ is a trivalent hydrocarbyl group of from 1 to about 16 carbon atoms; $R^4$ is $CH_2CH_2O$, $CH_2CH_2CH_2O$ or a mixture thereof; X is $SO_3^-$, $SO_4^-$ or $COO^-$; and Y is an alkali metal or

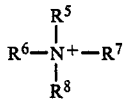

wherein $R^5$, $R^6$, $R^7$ and $R^8$ are independently hydrogen or methyl; and n is a number ranging from zero to about 15; and (B) a compound represented by the formula $$R^9\text{-}(R^{10})_mA^-D^+$$

wherein: $R^9$ is a hydrocarbyl group of from about 8 to about 24 carbon atoms; $R^{10}$ is $CH_2CH_2O$, $CH_2CH_2CH_2O$ or a mixture thereof; A is $SO_3^-$, $SO_4^-$ or $COO^-$; D is an alkali metal or

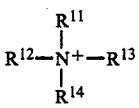

wherein $R^{11}$, $R^{12}$, $R^{13}$ and $R^{14}$ are independently hydrogen or methyl; and m is a number ranging from 1 to about 18. The invention further provides for an enhanced oil recovery method employing a surface active amount of the foregoing composition.

DESCRIPTION OF THE PREFERRED EMBODIMENTS

The term "hydrocarbyl", when used throughout this specification and in the appended claims, denotes a compound, composition and so forth having a predominantly hydrocarbon character within the context of the invention. Such materials include the following:

1. Hydrocarbon compounds, compositions, etc., that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic materials, and the like.

2. Substituted hydrocarbon compounds, compositions, etc., materials containing non-hydrocarbon substituents which, in the context of this invention, do not alter the predominantly hydrocarbon character of the material. Those skilled in the art will be aware of suitable substituents; examples are:

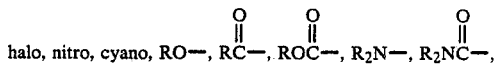

(R being hydrogen or a hydrocarbon group).

3. Hetero compounds, compositions etc.; that is, materials which, while predominantly hydrocarbon in character within the context of this invention, contain atoms other than carbon present in a chain or ring otherwise composed of carbon atoms. Suitable hetero atoms will be apparent to those skilled in the art and include, for example, oxygen and nitrogen.

In general, no more than about three substituents or hereto atoms, and preferably no more than one, will be present for each 10 carbon atoms in the hydrocarbon-based compound, composition or material.

Component (A) is a branched chain material represented by the formula

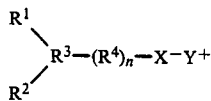

wherein: $R^1$ and $R^2$ are independently hydrocarbyl groups of from about 2 to about 24 carbon atoms, preferably from about 4 to about 12 carbon atoms; $R^3$ is a trivalent hydrocarbyl group of from 1 to about 16 carbon atoms preferably from about 1 to about 4 carbon atoms; $R^4$ is $CH_2CH_2O$, $CH_2CH_2CH_2O$ or a mixture thereof; X is $SO_3^-$, $SO_4^-$ or $COO^-$; and Y is an alkali metal or

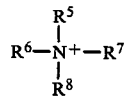

wherein $R^5$, $R^6$, $R^7$ and $R^8$ are independently hydrogen or methyl; and n is a number ranging from zero to about 15. $R^4$ is preferably $CH_2CH_2O$. X is preferably $SO_3^-$. Y is preferably an alkali metal, more preferably in the range of about 2 to about 3. In a particularly advantageous embodiment, component (A) has the formula

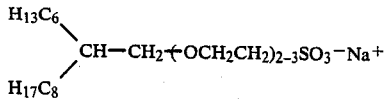

Component (A) can be prepared as follows. An alcohol having the desired branched chain structure is one of the starting materials. Any alcohol having the desired structure can be used, but preferably the alcohol is a Guerbet alcohol having the structure

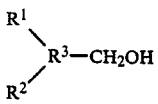

wherein $R^1$, $R^2$ and $R^3$ are defined above. These alcohols are described in greater detail in U.S. Pat. No. 4,011,273 which is incorporated herein by reference. An alkali metal hydride such as sodium hydride is dispersed in a suitable solvent such as tetrahydrofuran (THF). The alcohol is added slowly, while stirring, and the resulting mixture is heated under reflux conditions to form an intermediate salt. The desired ethane or propane sulfite, sulfate or carboxylate is added. The mixture is heated under reflux until the reaction is complete. The solvent is evaporated and the residue is washed with a mixture of water and 2-propanol. The mixture is saturated with a suitable salt of Y, for example a halogen salt such as sodium chloride. Two phases are formed, one being a 2-propanol phase containing the desired product. The 2-propanol phase is separated and diluted with water. This phase is then washed with a suitable solvent such as Skellysolve B (a product of the Skelly Oil Co. identified as a straight run aliphatic naphtha) or Hexane to remove any unreacted alcohol. The mixture is again saturated with the salt of Y and a 2-propanol phase containing the desired product is again separated. This phase is washed with chloroform to remove undesirable inorganic salts. This procedure is described in greater detail in the article by I. Carmona, R. S. Schechter, W. H. Wade, U. Weerasooriya and V. Weerasooriya entitled "Synthesis and Performance of Linear Monoisomeric Ethylene Oxide Sulfonate Surfactants", J. Dispersion Science and Technology, 4(4), 361-370 (1983), which is incorporated herein by reference.

Component (A) can also be prepared by the procedures described in U.S. Pat. Nos. 4,231,427; 4,269,271; 4,270,427; 4,307,782; 4,468,342; and 4,468,335 which are incorporated herein by reference.

The following Examples 1-3 are illustrative of the preparation of Component (A) using the procedure described in the above-cited Carmona et al article. Unless otherwise indicated, in the following examples as well as throughout the specification and claims, all parts and percentages are by weight, and all temperatures are in °C.

EXAMPLE 1

Sodium 2-(2-hexyldecyloxy) ethane sulfonate was prepared as follows. In a three-necked, one-liter, round-bottom flask (equipped with a reflux condenser, nitrogen inlet, and magnetic stirring bar), 2.64 gms. (0.11 moles) of sodium hydride were dispersed in 400 ml. of THF at room temperature under a dry nitrogen atmosphere. 50 ml. of a 0.1 molar solution of 2-hexyldecanol in THF were added slowly over a period of three minutes. The resulting mixture was maintained at reflux overnight using a heating mantle and stirring. 0.1 mole of sodium monoethanesulfonate was added. The mixture was heated and stirred for an additional 16 hours. THF was removed using rotary evaporation, and the residue was dissolved in a 1:1 (by volume) mixture of water and 2-propanol (1200 ml. of each). The temperature of the mixture was adjusted to 55° C. and sodium chloride was added until saturation was reached. A 2-propanol layer was isolated and separated. The 2-propanol layer was diluted with an equal volume of water, and washed twice with Skellysolve B to remove any unreacted 2-hexyldecanol. The temperature of this mixture was adjusted to 55° C. The mixture was again saturated with sodium chloride. A 2-propanol layer was isolated. The alcohol in this layer was evaporated and a product containing sodium 2-(2-hexyldecyloxy) ethane sulfonate was formed. This product was dissolved in 500 ml. of chloroform and filtered to remove undesirable inorganic salts. The chloroform was evaporated to provide the desired sodium 2-(2-hexyldecyloxy) ethane sulfonate.

EXAMPLE 2

Sodium 2-(2-hexyldecyloxyethoxy) ethane sulfonate was prepared using the following procedure.

Part A 2-hexyldecyloxyacetic acid was first prepared as follows. 3.6 gms (0.15 mole) of sodium hydride were dispersed in 400 ml. of THF at room temperature under a dry nitrogen atmosphere. 50 ml. of a 0.10 molar solution of 2-hexyldecanol in THF were added slowly over a period of three minutes. The resulting mixture was heated at reflux and stirred overnight. 0.1 mole of sodium chloroacetate was added with stirring. The resulting mixture was heated at reflux and stirred for 16 hours. 2-propanol was added to react with any excess base. THF was evaporated and the residue was dissolved in a 1:1 (by volume) mixture of water and 2-propanol (1200 ml. of each). The temperature of the resulting mixture was adjusted to 55° C. The mixture was saturated with sodium chloride. A 2-propanol layer was isolated and separated. The separated 2-propanol layer was diluted with water, washed two times with Skellysolve B, and saturated with sodium chloride at 55° C. A 2-propanol layer was again isolated and separated. This 2-propanol layer contained a crude carboxylate. The crude carboxylate was dissolved in 500 ml. of water, acidified with 10% $H_2SO_4$ to a pH of one, and extracted with 300 ml. of ether twice. The ether layers from the two extractions were washed four times with water and dried with anhydrous magnesium sulfate. 2-hexyldecyloxyacetic acid was isolated by evaporating the ether.

Part B

In a three-necked, one-liter, round-bottom flask (equipped with a reflux condenser, nitrogen inlet, dropping funnel, and magnetic stirring bar) 0.15 mole of lithium aluminum hydride was dispersed in 300 ml. of ether at room temperature and under a dry nitrogen atmosphere. The 2-hexyldecyloxyacetic acid from Part A was mixed with 200 ml. of ether and added dropwise with stirring. The resulting mixture was stirred overnight at room temperature. The flask containing the mixture was then cooled in ice, and icecold water was added dropwise to the mixture to react with any excess reducing agents. The reaction mixture was acidified with 10% $H_2SO_4$ to a pH of one, and extracted with 300 ml. of ether twice. The ether layers from the two extractions were diluted with an equal volume of water, and washed two times with saturated $NaHC_3$ solution. The mixture was then washed with water and dried with anhydrous magnesium sulfate. 2-hexyldecyloxyethanol was obtained after removing the ether.

Part C

In a three-necked, one-liter, round-bottom flask (equipped with a reflux condenser, nitrogen inlet, and magnetic stirring bar), 2.64 gms. (0.11 moles) of sodium hydride were dispersed in 400 ml. of THF at room temperature under a dry nitrogen atmosphere. 50 ml. of a 0.1 molar solution of the 2-hexyldecyloxyethanol from Part B in THF were added slowly over a period of three minutes. The resulting mixture was maintained at reflux overnight using a heating mantle and stirring. While the mixture was stirred, 0.1 mole of sodium monoethaneslfonate was added. The mixture was heated and stirred for an additional 16 hours. THF was removed using rotary evaporation, and the residue was dissolved in a 1:1 (by volume) mixture of water and 2-propanol (1200 ml. of each). The temperature of the mixture was adjusted to 55° C. and sodium chloride was added until saturation was reached. A 2-propanol layer was isolated and separated. The 2-propanol layer was diluted with an equal volume of water, and washed twice with Skellysolve B to remove any unreacted 2-hexyldecyloxyethanol. The temperature of this mixture was adjusted to 55° C. The mixture was again saturated with sodium chloride. A 2-propanol layer was isolated. The alcohol in this layer was evaporated and a product containing sodium 2-(2-hexyldecyloxyethoxy) ethane sulfonate was formed. This product was dissolved in 500 ml. of chloroform and filtered to remove undesirable inorganic salts. The chloroform was evaporated to provide the desired sodium 2-(2-hexyldecyloxyethoxy) ethane sulfonate.

EXAMPLE 3

Sodium 2-(2-hexyldecyloxyethoxyethoxy) ethane sulfonate was prepared using the following procedure.

Part A 2-hexyldecyloxyethoxyacetic acid was first prepared as follows. 3.6 gms (0.15 mole) of sodium hydride were dispersed in 400 ml. of THF at room temperature under a dry nitrogen atmosphere. 50 ml. of a 0.10 molar solution of 2-hexyldecanol in THF were added slowly over a period of three minutes. The resulting mixture was heated at reflux and stirred overnight. 0.1 mole of sodium chloroacetate was added with stirring. The mixture was heated at reflux and stirred for 16 hours. 0.1 mole of sodium chloroacetate was again added with stirring. The mixture was again heated at reflux and stirred for 16 hours. 2-propanol was added to react with any excess base. THF was evaporated and the residue was dissolved in a 1:1 (by volume) mixture of water and 2-propanol (1200 ml. of each). The temperature of the resulting mixture was adjusted to 55° C. The mixture was saturated with sodium chloride. A 2-propanol layer was isolated and separated. The separated 2-propanol layer was diluted with water, washed two times with Skellysolve B, and saturated with sodium chloride at 55° C. A 2-propanol layer was isolated and separated. A crude carboxylate was obtained. The crude carboxylate was dissolved in 500 ml. of water, acidified with 10% $H_2SO_4$ to pH of one, and extracted with 300 ml. of ether twice. The ether layers from the two extractions were washed four times with water and dried with anhydrous magnesium sulfate. 2-hexyldecyloxyethoxyacetic acid was isolated by evaporating the ether.

Part B

In three-necked, one-liter, round-bottom flask (equipped with a reflux condenser, nitrogen inlet, dropping funnel, and magnetic stirring bar) 0.15 mole of lithium aluminum hydride was dispersed in 300 ml. of ether at room temperature and under a dry nitrogen atmosphere. The 2-hexyldecyloxyethoxyacetic acid from Part A was mixed with 200 ml. of ether and added dropwise with stirring. The resulting mixture was stirred overnight at room temperature. The flask containing the mixture was then cooled in ice, and icecold water was added dropwise to the mixture to react with any excess reducing agents. The reaction mixture was acidified with 10% $H_2SO_4$ to a pH of one, and extracted with 300 ml. of ether twice. The ether layers from the two extractions were diluted with an equal volume of water, and washed two times with saturated $NaHCO_3$ solution. The mixture was then washed with water and dried with anhydrous magnesium sulfate. 2-hexyldecyloxyethoxyethanol was obtained after removing the ether.

Part C

In a three-necked, one-liter, round-bottom flask (equipped with a reflux condenser, nitrogen inlet, and magnetic stirring bar), 2.64 gms. (0.11 moles) of sodium hydride were dispersed in 400 ml. of THF at room temperatures under a dry nitrogen atmosphere. 50 ml. of a 0.1 molar solution of the 2-hexyldecyloxyethoxyethanol from Part B in THF were added slowly over a period of three minutes. The resulting mixture was maintained at reflux overnight using a heating mantle and stirring. While the mixture was stirred, 0.1 mole of sodium monoethanesulfonate was added. The mixture was heated and stirred for an additional 16 hours. THF was removed using rotary evaporation, and the residue was dissolved in a 1:1 (by volume) mixture of water and 2-propanol (1200 ml. of each). The temperature of the mixture was adjusted to 55° C. and sodium chloride was added until saturation was reached. A 2-propanol layer was isolated and separated. The 2-propanol layer was diluted with an equal volume of water, and washed twice with Skellysolve B to remove any unreacted 2-hexyldecyloxyethoxyethanol. The temperature of this mixture was adjusted to 55° C. The mixture was again saturated with sodium chloride. A 2-propanol layer was isolated. The alcohol in this layer was evaporated and a product containing sodium 2-(2-hexyldecyloxyethoxyethoxy) ethane sulfonate was formed. This product was dissolved in 500 ml. of chloroform and filtered to remove undesirable inorganic salts. The chloroform was evaporated to provide the desired sodium 2-(2-hexyldecyloxyethoxyethoxy) ethane sulfonate.

Component (B) is a material represented by the formula $$R^9\text{-}(R^{10})_m A^- D^+$$

wherein: $R^9$ is a hydrocarbyl group of from about 8 to about 24 carbon atoms; $R^{10}$ is $CH_2CH_2O$, $CH_2CH_2CH_2O$ or a mixture thereof; A is $SO_3^-$, $SO_4^-$ or $COO^-$; D is an alkali metal or $$R^{12}-\overset{\overset{R^{11}}{|}}{\underset{\underset{R^{14}}{|}}{N^+}}-R^{13}$$

wherein $R^{11}$, $R^{12}$, $R^{13}$ and $R^{14}$ are independently hydrogen or methyl; and m is a number ranging from 1 to about 18. $R^9$ preferably has from about 16 to about 24 carbon atoms, more preferably about 20 carbon atoms. $R^{10}$ is preferably $CH_2CH_2O$. $A^-$ is preferably $SO_3^-$. $D^+$ is preferably an alkali metal, more preferably sodium. m is preferably in the range of from about 2 to about 4, more preferably about 3. In a particularly advantageous embodiment, component (B) is represented by the formula $$H_{41}C_{20}\text{-}OCH_2CH_2)_3SO_3^-Na^+.$$

Both components (A) and (B) have a high tolerance to high levels of aqueous phase salinity (e.g., TDS values of up to about 20,000 ppm) as well as high levels of divalent metal ions such as calcium, magnesium, and the like (e.g., up to about 1,000 ppm). Accordingly, the water employed in the inventive method can be a high salinity brine such as sea water.

Components (A) and (B) are preferably combined at a ratio in the range of from about 0.02 to about 7 moles of (B) per mole of (A), preferably from about 0.04 to about 5 moles of (B) per mole of (A), more preferably from about 0.05 to about 2 moles of (B) per mole of (A), more preferably from about 0.05 to about 1 mole of (B) per mole of (A), and advantageously about 0.08 moles of (B) per mole of (A).

Components (A) and (B) are preferably present in the aqueous compositions used in accordance with the inventive method in minor surface-active amounts (that is, effective amounts to reduce the oil-water interfacial tension and/or alter the wettability characteristics of the reservoir rock), preferably at a combined concentration in the range of from about 0.01% to about 6% by weight, more preferably about 0.1% to about 3% by weight of said aqueous composition.

The method of the present invention may be carried out utilizing injection and production systems as defined by any suitable arrangement of wells. One well arrangement commonly used in waterflooding operations and suitable for use in carrying out the method of the present invention is an integrated five-spot pattern of the type illustrated in U.S. Pat. No. 3,927,716 which is incorporated herein by reference. Other well arrangements used in the art may also be used in carrying out the present invention.

The term "pore volume" is used herein to mean that volume of the portion of the formation underlying the well pattern employed, as described in greater detail in U.S. Pat. No. 3,927,716.

The aqueous composition that is injected in accordance with the inventive method can be referred to as a surfactant slug. In a typical operation, the surfactant slug is injected into the formation through one or more injection wells using standard techniques known in the art, then a buffer slug is injected, and finally an aqueous flooding medium is injected after the buffer slug to drive the oil toward one or more production wells. The surfactant slug typically has a lower viscosity than the buffer slug, and contains an effective amount of surfactant to reduce the oil-water interfacial tension and/or alter the wettability characteristics of the reservoir rock. The surfactant slug can contain a thickener; the concentration of the thickener preferably being in the range of about 0.05% to about 0.2% by weight. The buffer slug contains an effective amount of a thickener to increase the viscosity of the buffer slug to a level above that of the surfactant slug, and thereby decrease the mobility ratio between the injected water and the oil in the formation.

The size of the surfactant slug ranges from about 0.2 to about 3 pore volumes. The combined concentration of components (A) and (B) in the surfactant slug is preferably adjusted in accordance with the size of the slug. Thus, a surfactant slug with a pore volume of about 0.2 preferably has a combined surfactant concentration of about 1 to about 3% by weight. A surfactant slug with a pore volume of about 1 preferably has a surfactant concentration of about 0.1 to about 2% by weight. A surfactant slug with a pore volume of about 2 preferably has a surfactant concentration of about 0.1 to about 1.0% by weight.

The buffer slug can employ any thickening agent that is stable under the anticipated operating conditions. The thickening agent is employed at an effective level to increase the viscosity of the buffer slug to a value in excess of the viscosity of the surfactant slug to provide an enhanced mobility ratio between the buffer slug and the surfactant slug and thereby increase the macroscopic displacement efficiency of the water-flood. Examples of thickeners that are useful under various circumstances include Polysaccharide B-1459 available from Kelco Company under the tradename "Kelzan" or the partially hydrolyzed polyacylamides available from the Dow Chemical Company under the tradename "Pusher" chemicals.

A class of thickeners that is particularly useful includes the homopolysaccharide gum thickeners. These thickeners are typically nonionic and have a molecular weight that is greater than about one million, preferably in the range of about 1 to about 3.5 million, and are represented by the formula

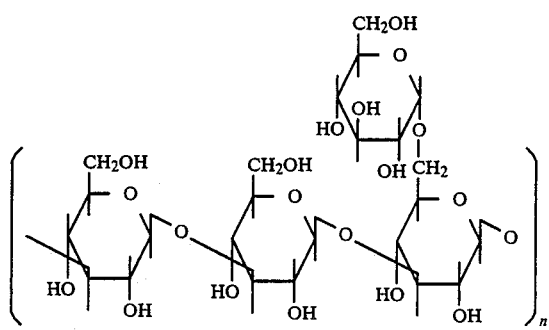

wherein n is a number that is high enough to provide the desired molecular weight. The polymer structure is preferably a linear chain of anhydroglucose units linked beta (1-3). In a particularly advantageous embodiment about 30 to about 35% of the linear chain units bear single appended anhydroglucose units linked beta (1-6). This thickener is preferably cell-free and produced by selected fungus strains of the genus Schlerotium in a pure culture fermentation. An example of a commercially available thickener that is suitable for use in accordance with the method of the present invention is ACTIGUM CS 11 L, a product of CECA S.A., which is identified as a solution of a water-soluble gum "Scleroglucan".

The homopolysaccharide gum thickeners have a number of significant advantages over many of the conventional waterflooding thickeners. First, these thickeners are generally more thermally stable. That is, they undergo only a moderate decrease in viscosity when temperatures increases while most natural and synthetic gums undergo a marked decrease in viscosity with increase in temperature. With these thickeners, the changes in viscosity at low concentrations are relatively small. Second, these thickeners are relatively easy to inject. Close to the injection well, flooding fluids have to flow at relatively fast rates. Shear rates can be in the range of several hundreds of sec$^{-1}$. These thickeners maintain their viscosities almost unchanged after strong mechanical shearing. Third, these thickeners have a relatively high salt tolerance, particularly with respect to divalent and trivalent metal ions. Fourth, the viscosities of the surfactant slugs and buffer slugs of the present invention are relatively unaffected by pH variations in the range of about 3 to about 11.

The buffer slug employed in accordance with the invention preferably has a thickener concentration of about 0.05% to about 0.2% by weight, more preferably about 0.05 to about 0.1% by weight. Preferably, the concentration of thickener in the buffer slug is at least about 0.02% by weight higher than the concentration of thickener in the surfactant slug. The higher concentration of thickener in the buffer slug in relation to concentration of thickener, if any, in the surfactant slug is essential to the effective operation of the method of the present invention to insure proper control of the relative mobilities of the surfactant slug and the buffer slug. The buffer slug preferably has a pore volume in the range of about 0.6 to about 3.

The drive fluid or aqueous flooding medium is injected into the reservoir in sequential order after the surfactant slug and buffer slug. This flooding medium is preferably water and can be any source of water, such as sea water, that is readily available.

An advantage of the method of the present invention is that it can be practiced in subterranean formations having temperatures ranging up to about 300° C., preferably in the range of about 15° C. to about 100° C. and high pressures (e.g., up to about 4000 psi). The flood water can have a high salinity (e.g., TDS values as high as about 200,000 ppm such as when the floodwater is sea water), high concentrations of divalent metal ions (e.g., up to 20,000 ppm), and a wide range of pH ranging from about 3 to about 13, preferably from about 4.5 to about 9. These conditions are typically encountered under various circumstances at Prudhoe Bay, the North Sea, the Persian Gulf, the Gulf of Mexico, as well as other major oil fields.

The following Example 4 is provided for the purpose of illustrating the effectiveness of the inventive surfactant combinations in enhanced oil recovery.

EXAMPLE 4

Interfacial Tension (IFT) measurements using a spinning drop tensiometer were made against a dead crude oil using the following surfactants:

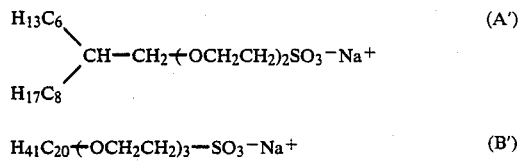

The measurements reported are between the excess oil and excess brine phases. Aqueous compositions consisting of sea water and the indicated concentrations of surfactants were used. In each test the IFT was measured at 80° C. IFT values for sea water containing 0.9% by weight of (A') and 0.1% by weight of (B') are indicated in Table I:

TABLE I

| Spinning Time (Min) | IFT (dyne/cm) |
|---|---|
| 0-1 | 0.109 |
| 1-2 | 0.053 |
| 3 | 0.0051 |
| 5 | 0.0014 |
| 10 | 0.0058 |
| 15 | 0.0032 |
| 65 | 0.012 |
| 110 | 0.0119 |

Tables II and III are provided for purposes of comparison. In Table II surfactant (A') was used in sea water as the sole surfactant at a concentration of 1.0% by weight.

TABLE II

| Spinning Time (Min) | IFT (dyne/cm) |
| --- | --- |
| 5 | 0.012 |
| 10 | 0.013 |
| 20 | 0.012 |
| 30 | 0.012 |
| 50 | 0.017 |
| 100 | 0.018 |
| 110 | 0.019 |

In Table III surfactant (B') was used in sea water as the sole surfactant at a concentration of 1.0% by weight.

TABLE III

| Spinning Time (Min) | IFT (dyne/cm) |
| --- | --- |
| 1 | 5.26 |
| 7 | 4.65 |
| 75 | 3.17 |
| 135 | 2.81 |

The data in Table I indicates that the surfactant combinations of the invention are useful in generating low IFT values with crude oil under high temperature and high salinity reservoir conditions. A comparison of the data in Table I with the data in Table II and III indicates that the combination of surfactants employed in accordance with the inventive method provides a significant improvement in the IFT characteristics over the use of the individual surfactants by themselves at comparable concentrations.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A method of recovering oil from a subterranean formation comprising injection into said formation an aqueous composition comprising a surface-active amount of a composition comprising:

(A) a compound represented by the formula $$\begin{array}{c} H_{13}C_6 \\ \phantom{H_{13}C_6} \diagdown \\ \phantom{H_{13}C_6 \diagdown} CH-CH_2(OCH_2CH_2)_2SO_3{}^-Na^+ \\ \phantom{H_{13}C_6} \diagup \\ H_{17}C_8 \end{array}$$

and (B) a compound represented by the formula $H_{41}C_{20}(OCH_2CH_2)_3\text{-}SO_3{}^-Na^+$ the mole ratio of (B) to (A) ranging from about 0.02 to about 7, said method further comprising the step of driving said oil toward one or more production wells.

2. The method of claim 1 wherein the mole ratio of (B) to (A) ranges from about 0.05 to about 2.

3. The method of claim 1 wherein said composition comprising components (A) and (B) is present in said aqueous composition at a concentration in the range of about 0.01% to about 6% by weight.

4. The method of claim 1 wherein said composition comprising components (A) and (B) is present in said aqueous composition at a concentration in the range of about 0.1% to about 3% by weight.

5. The method of claim 1 wherein the average temperature of the oil in said formation is in the range of up to about 300° C.

6. The method of claim 1 wherein the water in said aqueous composition has a TDS of up to about 200,000 ppm.

7. The method of claim 1 wherein said aqueous composition has a divalent metal ion concentration of up to about 20,000 ppm.

8. The method of claim 1 wherein the pressure within said formation ranges up to about 4000 psi.

9. The method of claim 1 wherein the water in said aqueous composition comprises sea water.

10. The method of claim 1 wherein said aqueous composition comprises a surfactant slug, said surfactant slug being injected into said formation through one or more injection wells, said method further comprising the steps of:

injecting into said formation through said injection wells a buffer slug to follow said surfactant slug, said buffer slug comprising an aqueous solution containing an effective amount of a thickener to provide said buffer slug with a viscosity exceeding the viscosity of said surfactant slug, then injecting into said formation through said injection wells an aqueous flooding medium to driven the oil toward one or more production wells.

11. The method of claim 10 wherein the amount of said surfactant slug injected into said formation is equal to about 0.2 to about 3 pore volumes.

12. The method of claim 10 wherein the amount of said buffer slug injected into said formation is equal to about 0.5 to about 3 pore volumes.

13. The method of claim 10 wherein said surfactant slug contains about 0.05 to about 0.2% by weight of a thickener.

14. The method of claim 10 wherein the concentration of said thickener in said buffer slug is at least about 0.02% by weight higher than the concentration of said thickener in said surfactant slug.

15. The method of claim 10 wherein said thickener is a homopolysaccharide gum thickener represented by the formula $$\left( \begin{array}{c} \text{[structure of homopolysaccharide repeating unit with CH}_2\text{OH, OH, and O groups]} \end{array} \right)_n$$

wherein n is a number that is high enough to provide a molecular weight of at least about one million.

16. The method of claim 10 wherein the water in said surfactant slug, buffer slug and aqueous flooding medium comprises sea water.

* * * * *